United States Patent [19]

Fortune

[11] 4,221,017
[45] Sep. 9, 1980

[54] VACUUM DESOLDERING TOOL AND TOOL CLEANER SYSTEM

[76] Inventor: William S. Fortune, 14250 Dearborn St., Panorama City, Calif. 91404

[21] Appl. No.: 959,013

[22] Filed: Nov. 9, 1978

[51] Int. Cl.³ ............................ A47L 5/18; B23K 3/00
[52] U.S. Cl. ...................................... 15/344; 15/409; 228/20
[58] Field of Search ...................... 228/20, 19; 15/344, 15/409

[56] References Cited

U.S. PATENT DOCUMENTS

| | | | |
|---|---|---|---|
| 3,971,096 | 7/1976 | Renholt | 151/409 X |
| 3,980,218 | 9/1976 | Fortune | 228/20 |
| 3,987,954 | 10/1976 | Litt | 228/20 |

Primary Examiner—Milton S. Mehr
Attorney, Agent, or Firm—Daniel T. Anderson

[57] ABSTRACT

A vacuum desoldering tool and tool cleaner system is disclosed. The desoldering tool is connectable at will to a vacuum source and features a venturi exhaust and separate muffler or end cap for the tool. The venturi throat is relatively short and preferably has a ratio of the input throat to the output throat of 4 to 1 or more. The muffler or end cap has a smooth rounded surface and is provided with radially extending openings to serve as an exhaust and muffler. The tool also has an end cap and nozzle tip therefor which are connected to a metallic sleeve of the main portion of the tool by a threaded adaptor ring into which the end cap connects by a snap connection.

6 Claims, 5 Drawing Figures

VACUUM DESOLDERING TOOL AND TOOL CLEANER SYSTEM

BACKGROUND OF THE INVENTION

Various types of vacuum desoldering tools are known in the art. One of these is disclosed in the Applicant's prior U.S. Pat. No. 3,980,218 which discloses and claims such a tool shown in FIGS. 1 and 2. The present invention is related to a vacuum desoldering tool of the type where the vacuum is generated within the tool by the application of compressed air to a venturi throat. Such tools are generally known. They have been made in the past of metal. However, the known commercially available tool of this type is heavy because it consists of metal, the vacuum generated thereby is not sufficiently high and the tool is rather noisy.

It is accordingly an object of the present invention to provide a vacuum operated desoldering tool which is light in weight and avoids some of the drawbacks of prior art tools.

A further object of the present invention is to provide a tool of the character described which has a powerful vacuum action due to its venturi throat construction.

Still another object of the invention is to provide a vacuum desoldering tool having a smooth round end cap to minimize the danger of the operator hurting himself and which has a muffler action without requiring a filter.

SUMMARY OF THE INVENTION

Briefly these and other objects are achieved in accordance with the structural aspects of an example of the invention in which the vacuum operated desoldering tool includes a plastic venturi exhaust, as well as a plastic end cap forming a muffler. The two plastic parts have a snap connection to each other. While the muffler reduces the noise, it does not require a filter which in turn degrades the operation of the venturi tube. The end cap and nozzle tip are connected to the metal cylinder of the tool by a metal adaptor ring externally threaded for connection to the remainder of the tool.

There is also disclosed a new tool holder and tip cleaner of the type disclosed in connection with FIGS. 3 and 4 of applicant's prior patent above referred to.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

DESCRIPTION OF THE PREFERRED EMBODIMENT

Figure 1:
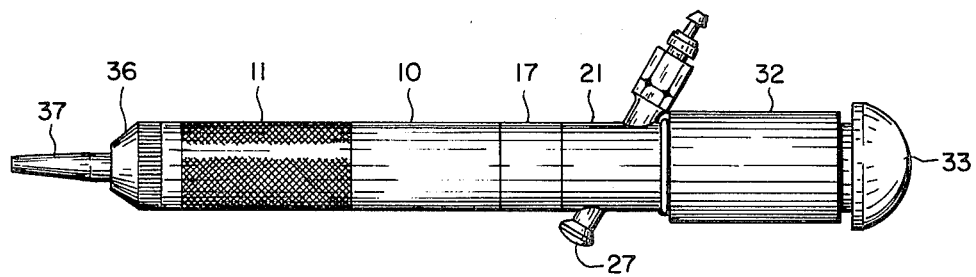
FIG. 1 is an elevational view of an example of the desoldering tool of the invention.
Figure 2:
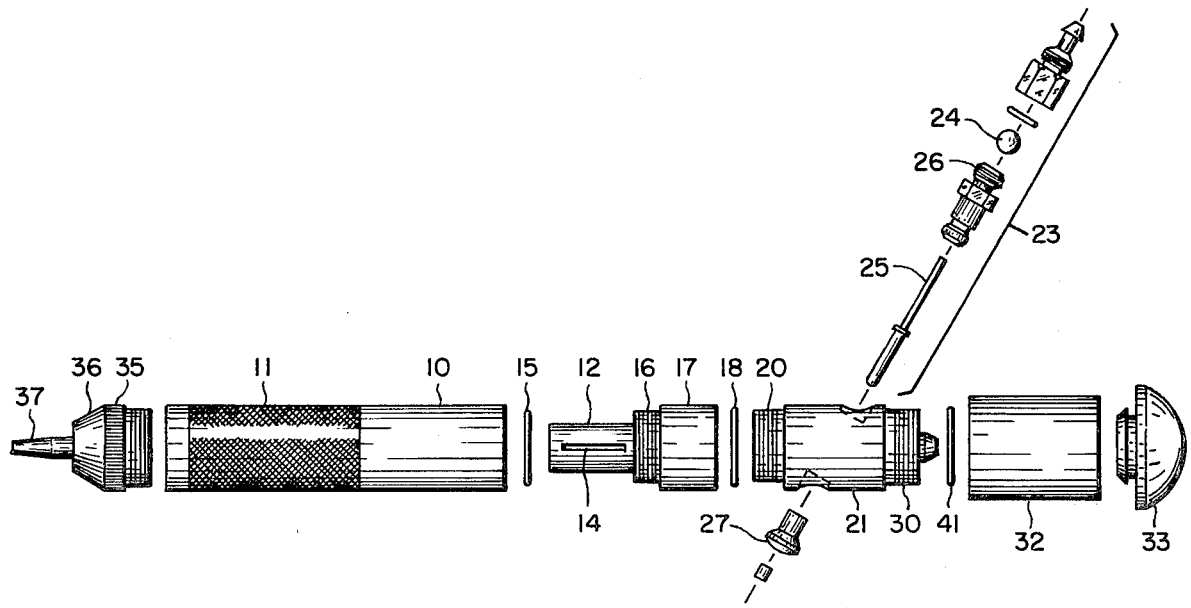
FIG. 2 is an exploded view of the tool of FIG. 1 and illustrating the valve mechanism for applying compressed air thereto.
Figure 3:
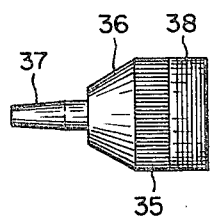
FIG. 3 is an elevational view of the end cap, nozzle tip and adaptor ring.

Referring now to the drawings and particularly to FIGS. 1-4, there is illustrated by way of example and for purposes of illustrative discussion only, a presently preferred embodiment of the vacuum operated desoldering tool of the present invention.

The tool includes a metallic cylinder 10 having a knurled front portion 11. Disposed in the tube 10 is a reduced diameter cylindrical portion 12 having a slot 14 therein for preventing solder from getting into the mechanism. A seal 15 is provided which fits against a ring 16 which has a snap connection with the cylinder 10. Hence the cylinder 10 is followed by another cylindrical portion 17 into which fits again a seal 18 and a front portion 20 of another cylinder 21 which bears the valve mechanism for applying at will compressed air to the tool. The valve mechanism generally shown at 23 is conventional and includes a ball 24 and a pin 25. The ball 24 normally seats against an interior shoulder in the portion 26 and may be removed from its seat by pressing the pin 25 against the ball 24. The pin 25 is actuated by an external button 27 which will permit compressed air to enter the interior of the cylinder 21. It will be noted that the cylinder 21 is provided with an external thread 30 at the rear end thereof for connection to a venturi exhaust 32 and outer cap 33 forming a muffler. All parts referred to so far except for the venturi exhaust 32 and outer caps 33 are commercially available.

The front end of the tool includes an adaptor ring 35 through which extends an end cap 36 which in turn bears a nozzle tip 37. The construction of the end cap 36 and nozzle tip 37 may, for example, be that disclosed and claimed in the applicant's copending applicationn, Ser. No. 922,676 filed on July 7, 1978. However, it will be understood that any conventional end cap and nozzle tip may be used instead. In any case, end cap and nozzle tip are connected together by a snap connection and in turn the end cap 36 has a snap connection with the adaptor ring 35. The adaptor ring 35 bears an external rearward thread 38 which engages with corresponding internal threads of the cylinder 11.

The nozzle tip 37 may, for example, consist of polytetrafluorethylene, better known under its trademark Teflon. The end cap 36 also consists of a plastic material. Preferably, the adaptro ring 35 consists of aluminum and both end cap 36 and nozzle tip 37 may, for purposes of removing electric charge from a workpiece, consist of an electrically conductive material. Such materials are available in the trade. They are made by incorporating into a plastic such as a polytetrafluorethylene or polyethylene a conductive material.

The nozzle tip 37 may either have a cylindrical opening or a conical opening with the wider part within the tool and the narrower portion at the tip of the nozzle so that they may readily be cleaned by passing a tip bore cleaning rod from the outside to the inside of the tool as will be more fully explained in connection with FIG. 5.

Figure 4:
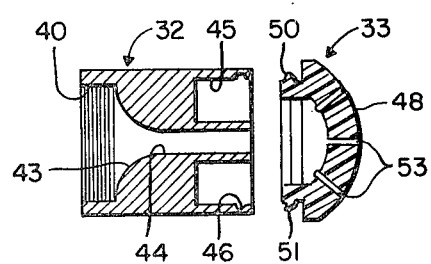
FIG. 4 is a cross-sectional view of the venturi exhaust and the end cap forming a muffler.

The venturi exhaust 32 and outer cap 33 are shown in more detail in FIG. 4. The venturi exhaust 32 has an outer cylindrical surface and is internally threaded as shown at 40 for connection to the threads 30 on the cylinder 21. A seal 41 may be disposed between the cylinder 21 and the venturi exhaust 32.

The venturi throat is shown at 43 and extends from the threads 40 rearwardly. It will be noted that the largest diameter of the venturi throat 43 is over four times that of the cylinder opening 44 which contributes to the powerful venturi action. Surrounding the opening 44 is a hollow cylindrical chamber 45 provided with an annular recess 46 forming a plenum.

The outer cap 33 has a smooth outwardly curved external surface 48 to protect the hand of the operator. It has a reduced diameter forwardly extending portion 50 which in turn is formed with a ring like projection 51 which snaps into the annular recess 46 of the exhaust 32. The plenum in 45 and the space foward within the curved wall of the outer cap 33 jointly form an exhaust plenum for the venturi 43. A plurality of openings 53 extend radially through the outer cap 48 to permit the compressed air to leave the exhaust plenum of the tool.

The tool is operated as follows: compressed air is permitted to enter the tool by depressing the button 27. The compressed air will then flow through the venturi throat 43, the cylindrical opening 44 into the plenum including the chamber 45, and then through the radial openings 53 in the outer cap 33. By the action of the venturi tube a region of reduced pressure is created through the venturi throat 43 which in turn sucks in the air in the remainder of the tool viz. through the nozzle tip 37.

This, of course, will enable the operator to suck in solder which has previously been liquified by the application of heat. The solder collects in the cylinder 10 and may from time to time be removed by unscrewing the adaptor ring 35 and unsnapping the cylinder 17. The slot 14 permits the air to move through to tool while forming a baffle which does not permit the solder to pass through the cylinder 17.

From time to time it may be desirable to clean out the nozzle tip. This may be effected with the tool holder and tip power cleaner of FIG. 5. This is a modification of a similar tool holder described and illustrated in FIGS. 3 and 4 of applicant's prior patent above referred to.

Figure 5:
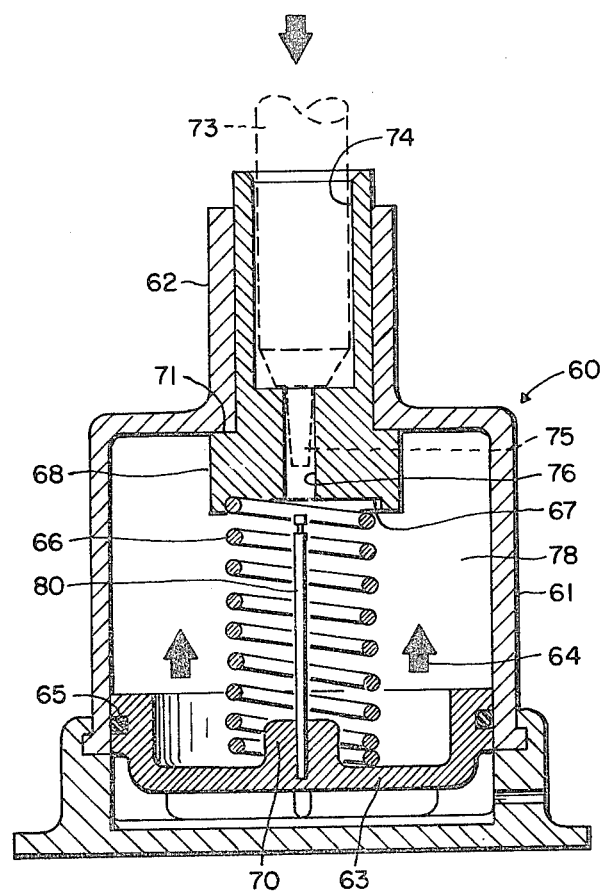
FIG. 5 is a cross-sectional view of the improved tool holder and tip cleaner, particularly suitable for the tool of FIGS. 1-4.

The tip cleaner of FIG. 5 includes a housing 60 having a lower cylindrical portion 61 and an upper cylindrical portion 62 of reduced diameter. Slidable within the cylinder 61 is a power piston 63 movable in the direction of the arrows 64. It is sealed against the walls of the cylinder 61 by an O-ring 65 and is urged downwardly by a spring 66 bearing against a cylindrical recess 67 in a sleeve 68 while its lower end surrounds a boss 70 of the piston 63. The sleeve 68 is movable in the cylindrical upper portion 62 and bears against a shoulder 71 of the housing 60.

The forward end of the tool of FIGS. 1–4 generally shown at 73 fits into the cylindrical recess 74 of the sleeve 68 while the nozzle tip 75 extends through the central opening 76 of the sleeve.

By depressing the button 27, compressed air is fed into the tool to create a suction action. The suction is then applied through the nozzle tip 75 to the interior 78 of the housing 60 which tends to pull the piston 63 upwardly in the direction of the arrows 64.

However, if the vacuum action should not be sufficient to lift the piston 63 the tool 73 may simply be pushed downwardly to depress the sleeve 68 against the action of the spring 66. In any case, a tip bore cleaning rod 80 which is secured to the boss 70 will enter the nozzle tip 75 thereby to clean out accumulated solder in the nozzle tip. The tool is then ready to be used again.

It is also feasible to use the tip cleaner of FIG. 5 by simply pushing the tool 73 into the opening 74 without the application of a vacuum and hance to push the sleeve 68 downwardly. Hence the tip cleaner may be used by mechanically pushing the soldering tool downwards, by applying a vacuum to the desoldering tool and by simultaneously using both methods.

It should be noted that not only the nozzle tip 37 and end cap 36 of the tool of FIGS. 1–4 but also the corresponding elements of the nozzle tip and end cap of applicant's prior application above referred to, preferably consist of an electrically conductive material to avoid the building up of static charges. Such static charges may be detrimental to the delicate components of integrated circuits and may easily damage them. Of course it will be understood that a conductive connection must be made between the nozzle tip and the operator's hand to avoid building up of static charges.

There has been disclosed an improved vacuum operated desoldering tool of the type where the vacuum is generated within the tool. The improved tool includes an electrically conductive nozzle tip and end cap. It also features an improved venturi and exhaust, as well as muffler and outer cap. The construction permits the generation of a higher vacuum and minimizes the production of noise.

I claim:

1. In a hand held vacuum desoldering tool of the type to be connected to and actuated by an external gas pressure source, the tool including a tip assembly, a hollow internallyunobstructed cylinder having means for connection to the tip assembly, a valve mechanism coupled to the cylinder for connecting at will the gas pressure source to the tool, a venturi exhaust and muffler comprising:
   (a) a venturi exhaust having means for connection to the cylinder, a venturi throat following in the direction of the gas flow, said means for connection followed by a relatively narrow passage in the direction of the gas flow, said narrow passage being surrounded by a wall forming with the outer wall of said exhaust an annular exhaust space and plenum, said venturi throat having a ratio of its largest diameter to the smallest diameter of at least 4 to 1; and
   (b) a rearwardly extending outer cap providing a muffler and forming a wall having a smooth outwardlycurved external surface, said outer cap being substantially unobstructed and having substantially gas-tight means for a connection to said exhaust, said outer cap being provided with a plurality of radially outwardly extending openings through the wall thereof to permit the compressed gas and the air sucked through said tip assembly to vent directly into the atmoshpere.

2. A tool as defined in claim 1, wherein said venturi exhaust and said outer cap consist of plastic.

3. A tool as defined in claim 1 wherein said connection means includes a snap connection between said venturi exhaust and said end cap.

4. A tool as defined in claim 1, wherein said tip assembly includes an end cap and a nozzle tip and an externally threaded adaptor ring through which said end cap extends, said adaptor ring being capable of threadably engaging said hollow cylinder.

5. A tool as defined in claim 4, wherein a snap connection is provided between said end cap and said adaptor ring.

6. A tool as defined in claim 4, wherein said end cap and said nozzle tip consist of a high temperature resistant, electrically conductive plastic, said hollow cylinder consisting of a metal.

* * * * *